United States Patent
Saha et al.

(10) Patent No.: US 9,530,056 B2
(45) Date of Patent: Dec. 27, 2016

(54) DAY NIGHT CLASSIFICATION OF IMAGES USING THRESHOLDING ON HSV HISTOGRAM

(76) Inventors: Bhaskar Saha, San Jose, CA (US); Daniel Davies, Palo Alto, CA (US); Ajay Raghavan, Mountain View, CA (US)

( * ) Notice: Subject to any disclaimer, the term of this patent is extended or adjusted under 35 U.S.C. 154(b) by 899 days.

(21) Appl. No.: 13/524,557

(22) Filed: Jun. 15, 2012

(65) Prior Publication Data

US 2013/0335556 A1 Dec. 19, 2013

(51) Int. Cl.
 *H04N 7/18* (2006.01)
 *G06K 9/00* (2006.01)

(52) U.S. Cl.
 CPC ................................ *G06K 9/00664* (2013.01)

(58) Field of Classification Search
 CPC .................................................... G06T 11/001
 USPC ......................................... 348/135; 382/162
 IPC ........................................................ H04N 7/18
 See application file for complete search history.

(56) References Cited

U.S. PATENT DOCUMENTS

| 7,447,352 | B2 | 11/2008 | Kim | |
|---|---|---|---|---|
| 7,555,159 | B2 | 6/2009 | Pishva | |
| 8,983,228 | B1 * | 3/2015 | Shynar | G06K 9/36 382/276 |
| 2006/0034510 | A1 * | 2/2006 | Kim | 382/168 |
| 2006/0215044 | A1 * | 9/2006 | Masuda et al. | 348/224.1 |
| 2006/0244583 | A1 * | 11/2006 | Kawada | 340/468 |

OTHER PUBLICATIONS

Miguel Angel Garcia-Garrido, et al., "Real Time Driving-Aid System for Different Lighting conditions, on Board a Road Vehicle," $32^{nd}$ Annual Conference on IEEE Industrial Electronics, IECON 2006.
Robert Kostia, "Video-Based Traffic Monitoring at Day and Night," in Proceedings of the $12^{th}$ International IEEE Conference on Intelligent Transportation Systems, St. Louis, MO, Oct. 3-7, 2009.
Dirk W. Hertel, et. al., "Image Quality Standards in Automotive Vision Applications," in Proceedings of the 2007 IEEE Intelligent Vehicles Symposium, Istanbul, Turkey, Jun. 13-15, 2007.

* cited by examiner

*Primary Examiner* — Yulin Sun
(74) *Attorney, Agent, or Firm* — Fay Sharpe LLP

(57) ABSTRACT

A method (300) is provided for classifying an image as being one of a daytime image or a nighttime image. The method includes: obtaining an image to be analyzed (302); determining a first parameter ($n_H$) representative of a first amount of pixels in the image that are sufficiently red or yellow (308); determining a second parameter ($n_V$) representative of a second amount of pixels in the image that are sufficiently light (308); and classifying an image as one of a daytime image or a nighttime image based upon the first and second parameters (310, 312, 314).

21 Claims, 3 Drawing Sheets

DAY NIGHT CLASSIFICATION OF IMAGES USING THRESHOLDING ON HSV HISTOGRAM

BACKGROUND

The present inventive subject matter relates generally to the art of image analysis. Particular but not exclusive relevance is found in connection with the analysis of images captured by red light and/or other traffic enforcement cameras. Accordingly, the present specification makes specific reference thereto. It is to be appreciated however that aspects of the present inventive subject matter are also equally amenable to other like applications.

For images captured with red light, traffic enforcement and/or other like automated and/or unattended cameras it is often desirable to know when or under what conditions an image was captured. For example, it may be desirable to classify images of a given scene (e.g., such as a roadway or traffic intersection) as being captured during the daytime (i.e., generally under relatively high natural ambient lighting conditions), or as being captured during the nighttime (i.e., generally under relatively low natural ambient lighting conditions). However, such classification of images can be complicated by scene illumination from various sources, e.g., such as artificially illuminated billboards and signs, traffic signals and lights, vehicle headlights, etc. Furthermore, difficulties can be experienced when attempting to distinguish daytime images captured with relatively low natural ambient lighting (e.g., images captures at dusk or dawn or with overcast conditions) from relatively brightly lit nighttime images (e.g., due to artificial lighting from various sources).

Accordingly, a new and/or improved method, system and/or apparatus for classifying images is disclosed which addresses the above-referenced problem(s) and/or others.

SUMMARY

This summary is provided to introduce concepts related to the present inventive subject matter. This summary is not intended to identify essential features of the claimed subject matter nor is it intended for use in determining or limiting the scope of the claimed subject matter.

In accordance with one embodiment, a method is provided for classifying an image as being one of a daytime image or a nighttime image. The method includes: obtaining an image to be analyzed; determining a first parameter representative of a first amount of pixels in the image that are sufficiently red or yellow; determining a second parameter representative of a second amount of pixels in the image that are sufficiently light; and classifying an image as one of a daytime image or a nighttime image based upon the first and second parameters.

In accordance with another embodiment, a camera system includes: a camera that obtains an image defined in a first color space; and an image processor. The image processor is operative to: determine a first parameter representative of a first amount of pixels in the image that are sufficiently red or yellow; determine a second parameter representative of a second amount of pixels in the image that are sufficiently light; and classify the image as one of a daytime image or a nighttime image based upon the first and second parameters.

Numerous advantages and benefits of the inventive subject matter disclosed herein will become apparent to those of ordinary skill in the art upon reading and understanding the present specification.

BRIEF DESCRIPTION OF THE DRAWING(S)

The following detailed description makes reference to the figures in the accompanying drawings. However, the inventive subject matter disclosed herein may take form in various components and arrangements of components, and in various steps and arrangements of steps. The drawings are only for purposes of illustrating exemplary and/or preferred embodiments and are not to be construed as limiting. Further, it is to be appreciated that the drawings may not be to scale.

DETAILED DESCRIPTION OF THE EMBODIMENT(S)

For clarity and simplicity, the present specification shall refer to structural and/or functional elements, relevant standards and/or protocols, and other components that are commonly known in the art without further detailed explanation as to their configuration or operation except to the extent they have been modified or altered in accordance with and/or to accommodate the preferred and/or other embodiment(s) presented herein.

The present specification describes generally a method, process, apparatus and/or system for classifying images captured by a camera, e.g., such as a red light or other traffic enforcement camera or other suitable automated or unmanned camera or the like. In practice, the described method, process, apparatus and/or system analyzes images obtained by a camera to automatically classify the images as being captured during the daytime or during the nighttime.

In general, it has been discovered that as compared to daytime images, nighttime images tend to be largely made up of pixels with hues substantially in the red and yellow regions of the spectrum, while normally exposed daytime images tend to have a significant number of pixels with hues substantially in the green and blue regions of the spectrum. In other words, for images obtained at nighttime (e.g., when ambient illumination is largely from artificial sources) as compared to daytime (e.g., when ambient illumination is largely from natural light), there is a distinct lack of color information, specifically in the blue and green regions of the spectrum. Moreover, daytime images tend to have a relatively abundant number of pixels which are sufficiently bright or light, while conversely nighttime images tend to have a relatively abundant number of pixels which are relatively dark or not sufficiently bright or light. However, overexposed daytime images can have a high number of yellow or red hued pixels due to the color temperature of sunlight. This situation can be distinguished from nighttime images by the predominance of bright pixels. Accordingly, the presently described method, process, apparatus and/or system takes advantage of a combination of these parameters (i.e., pixel hue and brightness or lightness) to distinguish daytime and nighttime images from one another and/or otherwise classify images as either daytime or nighttime images.

Figure 1:
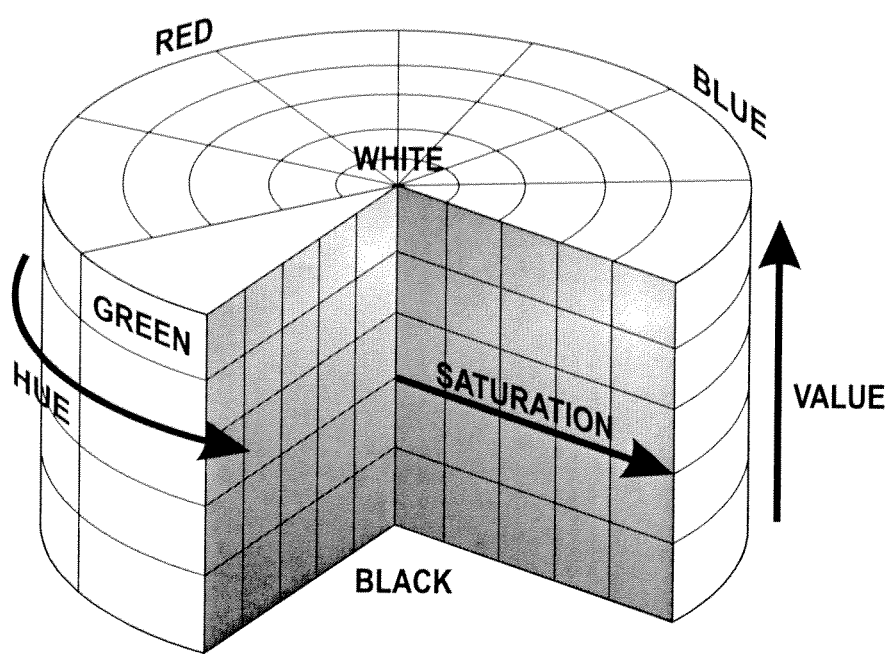
FIG. 1 is a graphical representation of a Hue-Saturation-Value (HSV) color space suitable for use in connection with aspects of the present inventive subject matter.

In one suitable embodiment, a digital image is captured in which pixels or the like thereof are defined and/or represented in a Red-Green-Blue (RGB) or other similar color space. The captured image is converted to a Hue-Saturation-Value (HSV) color space, e.g., with individual pixels thereof being defined by an H-component value, an S-component value and a V-component value. FIG. 1 shows a graphical representation of the HSV color space. In the illustrated cylinder, the angle around the central vertical axis corresponds to the hue or H-component, the distance from the axis corresponds to the saturation or S-component, and the distance along the axis corresponds to the value or V-component. In general, HSV color space has a cylindrical geometry, with the hue or H-component (represented by the angular dimension) starting at the red primary located at 0°, passing through the green primary at 120° and the blue primary at 240°, and then wrapping back to red at 360°. On a zero to one scale, the central vertical axis comprises the neutral, achromatic or gray colors, ranging from black (where the value or V-component is equal to 0) on the bottom, to white (where the value or V-component is equal to 1) on the top. Similarly, on a zero to one scale, the additive primary and secondary colors—red, yellow, green, cyan, blue, and magenta—and linear mixtures between adjacent pairs of them, sometimes called "pure colors," are arranged around the outside edge of the cylinder with a saturation of 1, while at the central vertical axis the saturation is zero.

Suitably, a histogram is calculated for the H and V components, e.g., by statistically binning the values of the respective components for the pixels of the image. Optionally, the number of bins is 256, for example. However, in practice, the number of bins may be more or less, for example, depending on the desired classification accuracy and/or computational considerations. In one suitable embodiment, the number of pixels ($n_H$) having an H-component value equal to or below a set or otherwise determined low hue threshold ($H_{Low\_TH}$) or equal to or above a set or otherwise determined high hue threshold ($H_{HIGH\_TH}$) may be counted from the H-histogram to represent those pixels which are sufficiently red and yellow in hue. Similarly, the number of pixels ($n_V$) having a V-component value equal to or above a set or otherwise determined value threshold ($V_{TH}$) may also be counted from the V-histogram to represent those pixels which are sufficiently light or bright. Consequently, if $n_H$ is substantially equal to or less than a set or otherwise determined hue count threshold $Th_H$ or if $n_V$ is substantially equal to or greater than a set or otherwise determined value count threshold $Th_V$, then the image is suitably classified as a daytime image; otherwise if $n_H$ is above $Th_H$ and $n_V$ is below $Th_V$, then the image is suitably classified as a nighttime image. Other embodiments may calculate the complementary pixel counts, $n_H$ denoting the blue and green hued pixels and $n_V$ denoting the dark valued pixels, either separately or jointly, and impose the inverse of the corresponding classification logic presented above.

Figure 2:
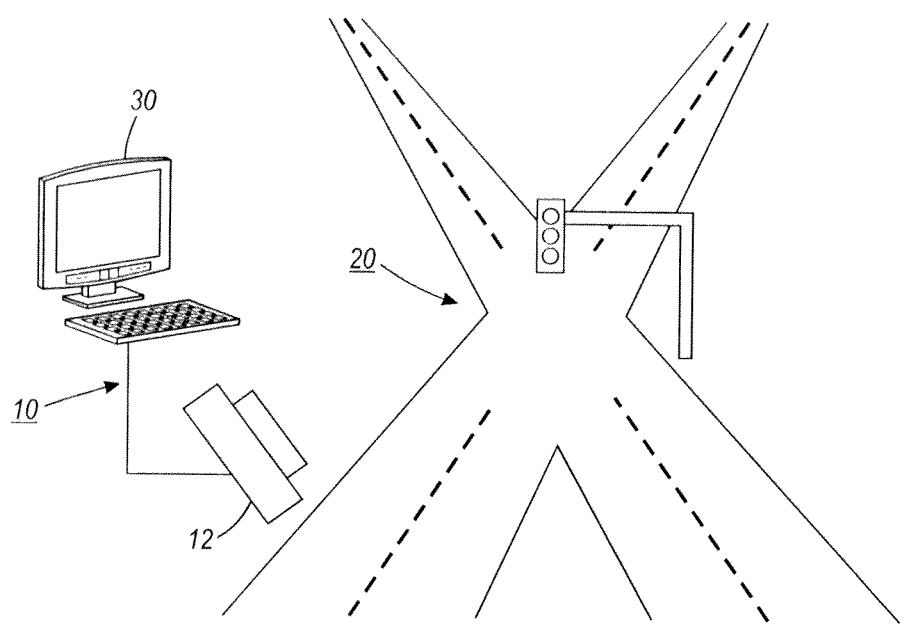
FIG. 2 is a diagrammatic illustration showing an exemplary camera system suitable for practicing aspects of the present inventive subject matter.

With reference now to FIG. 2, an automated and/or unattended camera system 10 includes a camera 12 for selectively capturing and/or obtaining an image of a scene 20 within the camera's FoV. In practice, the camera 12 may be a digital camera and may be either a still picture camera or a video camera. When referring herein to a captured or otherwise obtained image from the camera 12, it is intended to mean an image from a picture camera or a still frame from a video camera. In the illustrated example, the scene 20 at which the camera 12 is aimed and/or pointed is a traffic intersection including a traffic signal. Alternately, however, it is to be appreciated that in practice other scenes may be the subject of interest.

In the illustrated embodiment, the system 10 further includes a computer 30 or the like that is remotely or otherwise in communication with the camera 12. Suitably, the computer 30 obtains or otherwise receives and analyzes images captured by the camera 12 in order to automatically monitor, detect and/or report misalignment of the camera 12. In practice, the image obtained or received and analyzed by the computer 30 is a digital image, e.g., captured by a digital camera. Optionally, the computer 30 may receive an analog feed which is in turn digitized to obtain a digital image for analysis. In one suitable embodiment, the computer 30 obtains or receives and analyzes essentially all the images captured by the camera 12. Alternately, the computer 30 may obtain or receive and analyze a representative sample or other subset of the images captured by the camera 12 at periodic or intermittent intervals or otherwise chosen times. Suitably, the images may be transmitted from the camera 12 to the computer 30 and/or analyzed in real time or near real time or in batches or otherwise.

Figure 3:
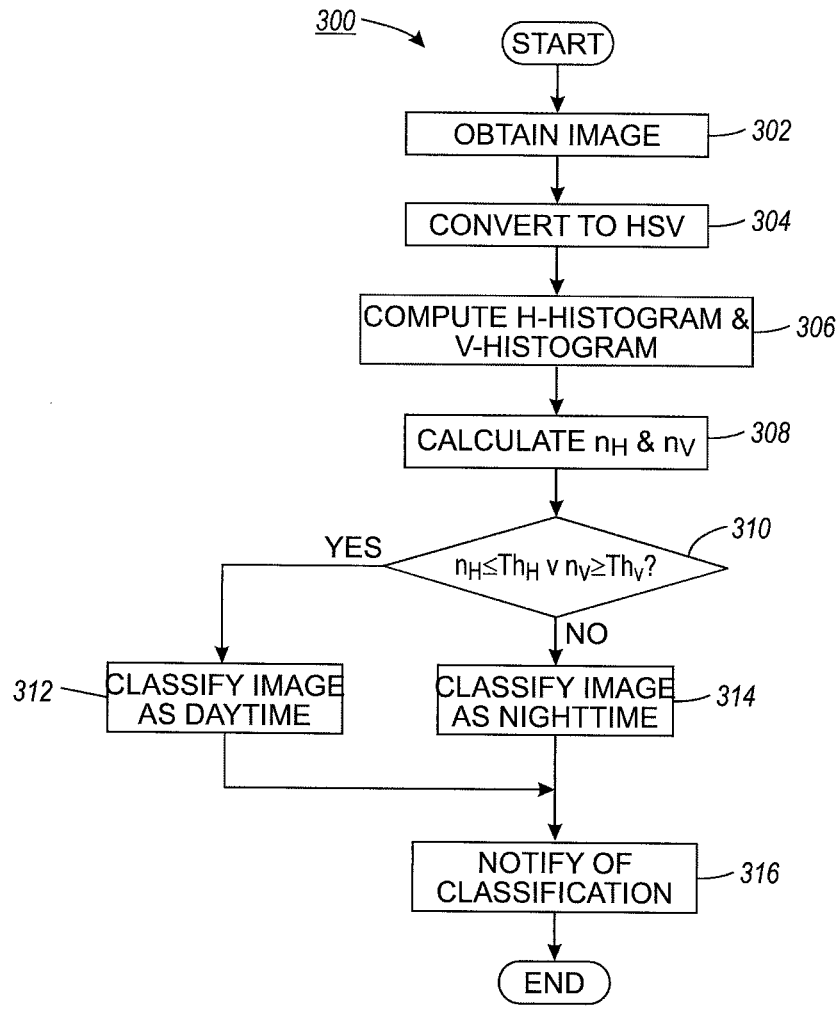
FIG. 3 is a flow chart illustrating an exemplary process for analyzing an image in accordance with aspects of the present inventive subject matter.

With reference now to FIG. 3, there is shown a flow chart illustrating an exemplary method and/or process 300 by which obtained or captured images are analyzed, e.g., by the computer 30.

As shown in step 302, an image is obtained. For example, the image may be captured by the camera 12 and transmitted to the computer 30 for analysis. In practice, the captured image may be a digital image that suitably includes pixels or the like which are defined and/or represented in an RGB or other similar color space. At step 304, the image is converted to an HSV color space, e.g., with individual pixels of the image being defined by an H-component value, an S-component value and a V-component value.

Suitably, to convert from the RGB color space to the HSV color space, the following equations and/or relationships may be employed for individual image pixels. The hue (H) of a given pixel may be computed or otherwise determined as follows:

$$H = 60° \times H'$$

where H' is given by:

$$H' = \begin{cases} \text{undefined, if } C = 0 \\ \dfrac{G-B}{C} \bmod 6, \text{ if } M = R \\ \dfrac{B-R}{C} + 2, \text{ if } M = G \\ \dfrac{R-G}{C} + 4, \text{ if } M = B \end{cases}$$

where C is:

$$C = M - m$$

where M is:

$$M = \max(R, G, B)$$

where m is:

$$m = \min(R, G, B)$$

and where R, G and B represent the R-component, the G-component and the B-component respectively of the pixel in the RGB color space, the "max" function returns the maximum value of the respective arguments, and the "min" function returns the minimum value of the respective arguments. Suitably, for convenience, neutral colors (i.e., with C=0) may be assigned a hue of 0°.

Using the above definitions and/or equations, the saturation (S) of a given pixel may be computed or otherwise determined as follows:

$$S = \begin{cases} 0, & \text{if } C = 0 \\ \dfrac{C}{V}, & \text{otherwise} \end{cases}$$

and the value (V) of a given pixel may be computed or otherwise determined as follows:

$$V = M$$

At step 306, a histogram is computed or otherwise determined for the H-component and V-component of the image in the HSV color space. Suitably, the histograms are calculated for the H and V components, e.g., by statistically binning the values of the respective components for the pixels of the image. Optionally, the number of bins is 256, for example. However, in practice, the number of bins may be more or less, for example, depending on the desired classification accuracy and/or computational considerations.

At step 308, $n_H$ and $n_V$ are calculated or otherwise determined, e.g., from the respective H and V histograms. In general, $n_H$ represents a count or other quantitative representation of the number or amount of pixels having a sufficiently red or yellow hue. For example, in one suitable embodiment, $n_H$ represents the number of pixels having an H-component value equal to or below a set or otherwise determined low hue threshold ($H_{LOW\_TH}$) or equal to or above a set or otherwise determined high hue threshold ($H_{HIGH\_TH}$) as counted or otherwise determined from the H-histogram. That is to say, $n_H$ represents all the pixels having an H-component below $H_{LOW\_TH}$ as well as all the pixels having an H-component above $H_{HIGH\_TH}$. Optionally, when the hue or H-component is considered or mapped on a scale from zero to 1, $H_{LOW\_TH}$ may be approximately 0.2 and $H_{HIGH\_TH}$ may be approximately 0.8. In other words, the thresholds essentially demark the lower 20% and upper 20% of the hue scale, i.e., the regions of the spectrum which are sufficiently red or yellow for the present application. In one suitable embodiment, $H_{LOW\_TH}$ may be set at about 50 (out of 256 levels) and $H_{HIGH\_TH}$ may be set at about 207 (out of 256 levels).

Additionally, $n_V$ represents a count or other quantitative representation of the number or amount of pixels which are sufficiently light or bright. For example, in one suitable embodiment, $n_V$ represents the number of pixels having a V-component value equal to or above a set or otherwise determined value threshold ($V_{TH}$) as counted or otherwise determined from the V-histogram. Optionally, $V_{TH}$ may be set at about 150 (out of 256 levels).

At decision step 310, it is determined if there are relatively few red and/or yellow pixels or if there is a relative abundance of sufficiently light or bright pixels. In particular, if there are relatively few red and/or yellow pixels (meaning there is sufficient blue and/or green color information in the image) or if there is a relative abundance of sufficiently light or bright pixels, then the image is determined to be and/or classified as a daytime image (e.g., at step 312); otherwise if there is a relative abundance of red and/or yellow pixels (meaning there is conversely relatively little blue and/or green color information in the image) and the image is relatively lacking in sufficiently light or bright pixels, then the image is determined to be and/or classified as a nighttime image (e.g., at step 314). For example, in one suitable embodiment, if $n_H$ is substantially equal to or less than a set or otherwise determined hue count threshold $Th_H$ or if $n_V$ is substantially equal to or greater than a set or otherwise determined value count threshold $Th_V$, then the image is suitably classified as a daytime image (e.g., at step 312); otherwise if $n_H$ is above $Th_H$ and $n_V$ is below $Th_V$, then the image is suitably classified as a nighttime image (e.g., at step 314). Other embodiments may calculate the complementary pixel counts, $n_H$ denoting the blue and green hued pixels and $n_V$ denoting the dark valued pixels, either separately or jointly, and impose the inverse of the corresponding classification logic presented above.

At step 316, a suitable notification of the classification is provided. For example, the computer 30 may provide such a notification by way of a visual indication, audible signal, display or sending of a suitable message, activation of a humanly perceivable alert or alarm, tagging of the image, etc.

The above elements, components, processes, methods, apparatus and/or systems have been described with respect to particular embodiments. It is to be appreciated, however, that certain modifications and/or alteration are also contemplated.

It is to be appreciated that in connection with the particular exemplary embodiment(s) presented herein certain structural and/or function features are described as being incorporated in defined elements and/or components. However, it is contemplated that these features may, to the same or similar benefit, also likewise be incorporated in other elements and/or components where appropriate. It is also to be appreciated that different aspects of the exemplary embodiments may be selectively employed as appropriate to achieve other alternate embodiments suited for desired applications, the other alternate embodiments thereby realizing the respective advantages of the aspects incorporated therein.

It is also to be appreciated that any one or more of the particular tasks, steps, processes, analysis, methods, functions, elements and/or components described herein may suitably be implemented via hardware, software, firmware or a combination thereof. For example, the computer 30 may include a processor, e.g., embodied by a computing or other electronic data processing device, that is configured and/or otherwise provisioned to perform one or more of the tasks, steps, processes, analysis, methods and/or functions described herein. For example, the computer 30 or other electronic data processing device employed in the system 10 may be provided, supplied and/or programmed with a suitable listing of code (e.g., such as source code, interpretive code, object code, directly executable code, and so forth) or other like instructions or software or firmware (e.g., such as an application to perform and/or administer the processing and/or image analysis described herein), such that when run and/or executed by the computer or other electronic data processing device one or more of the tasks, steps, processes, analysis, methods and/or functions described herein are completed or otherwise performed. Suitably, the listing of code or other like instructions or software or firmware is implemented as and/or recorded, stored, contained or included in and/or on a non-transitory computer and/or machine readable storage medium or media so as to be providable to and/or executable by the computer or other electronic data processing device. For example, suitable storage mediums and/or media can include but are not limited to: floppy disks, flexible disks, hard disks, magnetic tape, or any other magnetic storage medium or media, CD-ROM, DVD, optical disks, or any other optical medium or media, a RAM, a ROM, a PROM, an EPROM, a FLASH-EPROM, or other memory or chip or cartridge, or any other tangible medium or media from which a computer or machine or electronic data processing device can read and use. In essence, as used herein, non-transitory computer-readable and/or machine-readable mediums and/or media comprise all computer-readable and/or machine-readable mediums and/or media except for a transitory, propagating signal.

Optionally, any one or more of the particular tasks, steps, processes, analysis, methods, functions, elements and/or components described herein may be implemented on and/or embodiment in one or more general purpose computers, special purpose computer(s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, Graphical card CPU (GPU), or PAL, or the like. In general, any device, capable of implementing a finite state machine that is in turn capable of implementing the respective tasks, steps, processes, analysis, methods and/or functions described herein can be used.

Additionally, it is to be appreciated that certain elements described herein as incorporated together may under suitable circumstances be stand-alone elements or otherwise divided. Similarly, a plurality of particular functions described as being carried out by one particular element may be carried out by a plurality of distinct elements acting independently to carry out individual functions, or certain individual functions may be split-up and carried out by a plurality of distinct elements acting in concert. Alternately, some elements or components otherwise described and/or shown herein as distinct from one another may be physically or functionally combined where appropriate.

In short, the present specification has been set forth with reference to preferred and/or other embodiments. Obviously, modifications and alterations will occur to others upon reading and understanding the present specification. It is intended that the invention be construed as including all such modifications and alterations insofar as they come within the scope of the appended claims or the equivalents thereof.

What is claimed is:

1. A method for classifying an image as being one of a daytime image or a nighttime image, said method comprising:
    obtaining an image captured by a camera;
    analyzing said obtained image with an image processor, said analyzing including:
        determining a first parameter representative of a combination of a first amount of pixels in substantially the entire image that are sufficiently red and a second amount of pixels in substantially the entire image that are sufficiently yellow; and
        determining a second parameter representative of a third amount of pixels in substantially the entire image that are sufficiently light; and
    classifying the image as one of a daytime image or a nighttime image based upon the first and second parameters.

2. The method of claim 1, said analyzing further comprising:
    converting the obtained image from a first color space to a Hue-Saturation-Value (HSV) color space, wherein individual pixels of the image are defined by an H-component, an S-component, and a V-component.

3. The method of claim 2, wherein determining the first parameter comprises:
    counting a first number of pixels having an H-component that is equal to or less than a lower H-component threshold or equal to or more than an upper H-component threshold.

4. The method of claim 3, wherein determining the first parameter further comprises:
    computing a first histogram of the pixels' H-components, said first number being counted based on said first histogram.

5. The method of claim 3, wherein determining the second parameter comprises:
    counting a second number of pixels having a V-component that is equal to or more than a V-component threshold.

6. The method of claim 5, wherein determining the second parameter further comprises:
    computing a second histogram of the pixels' V-component, said second number being counted based on said second histogram.

7. The method of claim 1, wherein if the first parameter is equal to or less than a first threshold or the second parameter is equal to or greater than a second threshold, then the image is classified as a daytime image.

8. The method of claim 1, wherein if the first parameter is equal to or greater than a first threshold and the second parameter is equal to or less than a second threshold, then the image is classified as a nighttime image.

9. The method of claim 2, wherein the obtained image is defined in the first color space, said first color space being a Red-Green-Blue (RGB) color space.

10. An apparatus that executes the method of claim 1.

11. A non-transitory machine-readable medium including a computer program which when executed performs the method of claim 1.

12. A camera system comprising:
    a camera that obtains an image defined in a first color space; and
    an image processor that:
        determines a first parameter representative of a combination of a first amount of pixels in substantially the entire image that are sufficiently red and a second amount of pixels in substantially the entire image that are sufficiently yellow;
        determines a second parameter representative of a third amount of pixels in substantially the entire image that are sufficiently light; and
        classifies the image as one of a daytime image or a nighttime image based upon the first and second parameters.

13. The camera system of claim 12, wherein said image processor is further operative to:
    convert the obtained image from the first color space to a Hue-Saturation-Value (HSV) color space, wherein individual pixels of the image are defined by an H-component, an S-component, and a V-component.

14. The camera system of claim 13, wherein determining the first parameter comprises:
    counting a first number of pixels having an H-component that is equal to or less than a lower H-component threshold or equal to or more than an upper H-component threshold.

15. The camera system of claim 14, wherein determining the first parameter further comprises:

computing a first histogram of the pixels' H-components, said first number being counted based on said first histogram.

16. The camera system of claim 14, wherein determining the second parameter comprises:
    counting a second number of pixels having a V-component that is equal to or more than a V-component threshold.

17. The camera system of claim 16, wherein determining the second parameter further comprises:
    computing a second histogram of the pixels' V-component, said second number being counted based on said second histogram.

18. The camera system of claim 12, wherein if the first parameter is equal to or less than a first threshold or the second parameter is equal to or greater than a second threshold, then the image is classified as a daytime image.

19. The camera system of claim 12, wherein if the first parameter is equal to or greater than a first threshold and the second parameter is equal to or less than a second threshold, then the image is classified as a nighttime image.

20. The camera system of claim 13, wherein the first color space is a Red-Green-Blue (RGB) color space.

21. A method for classifying an image as being one of a daytime image or a nighttime image, said method comprising:
    obtaining an image captured by a camera;
    analyzing said obtained image with an image processor, said analyzing including:
        determining a first parameter representative of at least one of: (i) a combination of an amount of pixels in substantially the entire image that are sufficiently red and an amount of pixels in substantially the entire image that are sufficiently yellow; or (ii) a combination of an amount of pixels in substantially the entire image that are sufficiently blue and an amount of pixels in substantially the entire image that are sufficiently green; and
        determining a second parameter representative of at least one of: (i) an amount of pixels in substantially the entire image that are sufficiently light; or (ii) an amount of pixels in substantially the entire image that are sufficiently dark; and
    classifying the image as one of a daytime image or a nighttime image based upon the first and second parameters.

* * * * *